United States Patent
Welch

(10) Patent No.: US 10,386,636 B2
(45) Date of Patent: Aug. 20, 2019

(54) MULTI-FOCAL DISPLAY SYSTEM AND METHOD

(71) Applicant: Magic Leap, Inc., Dania Beach, FL (US)

(72) Inventor: William Hudson Welch, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 262 days.

(21) Appl. No.: 14/611,154

(22) Filed: Jan. 30, 2015

(65) Prior Publication Data

US 2015/0222883 A1    Aug. 6, 2015

Related U.S. Application Data

(60) Provisional application No. 61/934,565, filed on Jan. 31, 2014.

(51) Int. Cl.
| | |
|---|---|
| *G02B 27/01* | (2006.01) |
| *G02B 27/22* | (2018.01) |
| *G02B 27/00* | (2006.01) |
| *H04N 13/383* | (2018.01) |
| *G02B 15/00* | (2006.01) |

(52) U.S. Cl.
CPC ..... *G02B 27/0172* (2013.01); *G02B 27/0093* (2013.01); *G02B 27/2278* (2013.01); *G02B 15/00* (2013.01); *G02B 2027/0127* (2013.01); *G02B 2027/0185* (2013.01); *H04N 13/383* (2018.05)

(58) Field of Classification Search
CPC .......... G02B 27/0172; G02B 2027/014; G02B 27/017; G02B 27/0093; G06F 3/011; G06T 19/006; G06K 9/00671; H04N 13/0239; H04N 13/044; H04N 13/0014

USPC .......................................................... 348/46
See application file for complete search history.

(56) References Cited

U.S. PATENT DOCUMENTS

| | | | |
|---|---|---|---|
| 4,909,613 | A | 3/1990 | Kikuchi |
| 5,729,242 | A | 3/1998 | Margerum et al. |
| 5,751,494 | A | 5/1998 | Takahashi |
| 5,880,711 | A | 3/1999 | Tamada |
| 6,046,720 | A | 4/2000 | Melville et al. |
| 6,120,538 | A | 9/2000 | Rizzo et al. |
| 7,077,523 | B2 | 7/2006 | Seo et al. |
| 7,555,333 | B2 | 6/2009 | Wang et al. |
| 7,616,382 | B2 | 11/2009 | Inoguchi et al. |
| 7,784,697 | B2 | 8/2010 | Johnston et al. |

(Continued)

FOREIGN PATENT DOCUMENTS

| | | |
|---|---|---|
| JP | 8-166559 | 6/1996 |
| JP | 2010-008948 | 1/2010 |

(Continued)

OTHER PUBLICATIONS

PCT International Search Report and Written Opinion of the International Searching Authority for PCT/US15/13993, Applicant Magic Leap, Inc., dated Jun. 10, 2015 (7 pages).

(Continued)

*Primary Examiner* — Ayman A Abaza
(74) *Attorney, Agent, or Firm* — Vista IP Law Group LLP

(57) ABSTRACT

Configurations are disclosed for presenting virtual reality and augmented reality experiences to users. The system may comprise an accommodation tracking module to track an accommodation of a user's eyes, a first variable focus element (VFE) to switch between at least two focal planes, wherein a distance between the two focal planes is relatively consistent, and a second VFE to shift the at least two focal planes based at least in part on the tracked accommodation of the user's eyes.

23 Claims, 3 Drawing Sheets

(56) References Cited

U.S. PATENT DOCUMENTS

| | | | |
|---|---|---|---|
| 8,248,458 | B2 | 8/2012 | Schowengerdt et al. |
| 8,259,164 | B2 | 9/2012 | Saito et al. |
| 8,317,330 | B2 | 11/2012 | Yamazaki et al. |
| 8,384,999 | B1 | 2/2013 | Crosby et al. |
| 8,757,812 | B2 | 6/2014 | Melville et al. |
| 9,348,143 | B2 | 5/2016 | Gao et al. |
| 9,740,006 | B2 | 8/2017 | Gao |
| 9,846,967 | B2 | 12/2017 | Schowengerdt |
| 9,915,824 | B2 | 3/2018 | Schowengerdt et al. |
| 2001/0013960 | A1 | 8/2001 | Popovich et al. |
| 2002/0163482 | A1 | 11/2002 | Sullivan |
| 2003/0020879 | A1 | 1/2003 | Sonehara |
| 2006/0012851 | A1 | 1/2006 | Wu et al. |
| 2006/0028400 | A1 | 2/2006 | Lapstun et al. |
| 2006/0072843 | A1 | 4/2006 | Johnston |
| 2006/0120706 | A1 | 6/2006 | Cho et al. |
| 2008/0259463 | A1 | 10/2008 | Shepherd |
| 2008/0316610 | A1 | 12/2008 | Dobrusskin |
| 2009/0040138 | A1 | 2/2009 | Takahashi et al. |
| 2009/0316116 | A1 | 12/2009 | Melville et al. |
| 2010/0149073 | A1 | 6/2010 | Chaum et al. |
| 2010/0202054 | A1 | 8/2010 | Niederer |
| 2010/0289970 | A1 | 11/2010 | Watanabe |
| 2011/0075257 | A1 | 3/2011 | Hua et al. |
| 2012/0075534 | A1 | 3/2012 | Katz et al. |
| 2012/0105310 | A1 | 5/2012 | Sverdrup et al. |
| 2012/0113092 | A1* | 5/2012 | Bar-Zeev ............ G02B 27/017 345/419 |
| 2012/0162549 | A1 | 6/2012 | Gao et al. |
| 2012/0192991 | A1 | 8/2012 | Gupta et al. |
| 2013/0050832 | A1 | 2/2013 | Tohara et al. |
| 2013/0128230 | A1* | 5/2013 | Macnamara ........... G03B 21/00 353/7 |
| 2013/0176628 | A1 | 7/2013 | Batchko et al. |
| 2013/0187836 | A1 | 7/2013 | Cheng et al. |
| 2013/0265647 | A1 | 10/2013 | Kern |
| 2013/0300635 | A1 | 11/2013 | White et al. |
| 2014/0009845 | A1 | 1/2014 | Cheng et al. |
| 2014/0035959 | A1* | 2/2014 | Lapstun ............. H04N 13/0402 345/690 |
| 2014/0063055 | A1 | 3/2014 | Osterhout et al. |
| 2014/0071539 | A1 | 3/2014 | Gao |
| 2014/0111616 | A1 | 4/2014 | Blayvas |
| 2014/0168034 | A1 | 6/2014 | Luebke et al. |
| 2014/0184477 | A1 | 7/2014 | Hino et al. |
| 2015/0205126 | A1 | 7/2015 | Schowengerdt |
| 2015/0222884 | A1 | 8/2015 | Cheng |
| 2015/0234191 | A1 | 8/2015 | Schowengerdt |
| 2015/0248012 | A1 | 9/2015 | Schowengerdt |
| 2015/0277129 | A1 | 10/2015 | Hua et al. |
| 2015/0346490 | A1 | 12/2015 | Tekolset et al. |
| 2015/0346495 | A1 | 12/2015 | Welch et al. |
| 2016/0011419 | A1 | 1/2016 | Gao |

FOREIGN PATENT DOCUMENTS

| | | |
|---|---|---|
| WO | WO 2006017771 | 2/2006 |
| WO | WO 2006/070308 | 7/2006 |
| WO | WO 20090014525 | 1/2009 |
| WO | WO 2011134169 | 11/2011 |
| WO | WO 2012/088478 | 6/2012 |
| WO | WO 2014/062912 | 4/2014 |
| WO | WO 2014053194 | 4/2014 |

OTHER PUBLICATIONS

Non-Final Office Action for U.S. Appl. No. 14/611,162, dated Dec. 7, 2016.
Final Office Action for U.S. Appl. No. 14/611,162, dated Jul. 24, 2017.
PCT International Search Report and Written Opinion for International Appln. No. PCT/US15/13998, Applicant Magic Leap, Inc., dated May 1, 2015, 9 pages.
Non-Final Office Action for U.S. Appl. No. 14/726,429, dated Sep. 2, 2016.
Final Office Action for U.S. Appl. No. 14/726,429, dated May 17, 2017.
PCT International Search Report and Written Opinion for International Appln. No. PCT/US15/33416, Applicant Magic Leap, Inc., dated Oct. 26, 2015, 12 pages.
Hua, et al. "An Optical See-through Multi-Focal-Plane Stereoscopic Display Prototype Enabling Nearly-Correct Focus Cues," Stereoscopic Displays and Applications XXIV, Proc. of SPIE-IS&T Electronic Imaging, SPIE vol. 8648, 86481A, Mar. 12, 2013. doi: 10.1117/12.2005117.
Hu, Xinda. "Development of the Depth-Fused Multi-Focal-Plane Display Technology," the University of Arizona, 2014.
Cheng, et al. "Design of a wide-angle, lightweight head-mounted display using free-form optics tiling," Optics Letters, vol. 36, No. 11, Jun. 1, 2011,2098-2100.
Cheng, et al. "Light field head-mounted display with correct focus cue using micro structure array," Chinese Optics Letters, 12(6), Jun. 10, 2014, 060010.
Hu, et al. "High-resolution optical see-through multi-focal-plane head-mounted display using freeform optics," Optics Express, 22 (11),Jun. 2, 2014,13896-13903. OI: 10.1364/0E.22.013896.
Hu, et al. "A depth-fused multi-focal-plane display prototype enabling focus cues in stereoscopic displays," SID 11 Digest, 2011, 691-694.
Hu, et al. "Design of an optical see-through multi-focal-plane stereoscopic 3D display using freeform prisms," FiO/LS Technical Digest, 2012.
Hu, et al. "Design and assessment of a depth fused multi-focal-plane display prototype," Journal of display technology, 10 (4), Apr. 2014, 308-316.
PCT International Search Report and Written Opinion for International Appln. No. PCT/US15/33412, Applicant Magic Leap, Inc., dated Oct. 26, 2015, 13 pages.
Non-Final Office Action for U.S. Appl. No. 14/726,396, dated Mar. 15, 2017.
Final Office Action for U.S. Appl. No. 14/726,396, dated Aug. 16, 2017.
Response to Final Office Action for U.S. Appl. No. 14/726,429, filed Aug. 17, 2017.
Response to Non-Final Office Action for U.S. Appl. No. 14/611,162, filed Apr. 7, 2017.
Supplemental Response for U.S. Appl. No. 14/726,396, dated Feb. 21, 2017.
Response to Non-Final Office Action for U.S. Appl. No. 14/726,396, filed Jun. 15, 2017.
Extended European Search Report for EP Application No. 15743704.7 dated Sep. 8, 2017.
Schowengerdt, B., et al., "3D Displays Using Scanning Laser Projection," Department of Mechanical Engineering, University of Washington, ISSN 0097-966XX/12/4302, dated 2012 (4 pages).
Notice of Allowance for U.S. Appl. No. 14/726,429 dated Sep. 13, 2017.
Extended European Search Report for EP Application No. 15743225.3 dated Sep. 19, 2017.
Extended European Search Report for EP Appln. No. 15799774.3 dated Jan. 2, 2018.
Shiro Suyama et al., "Three-Dimensional Display System with Dual-Frequency Liquid-Crystal Varifocal Lens", Jpn J. Appl. Phys., vol. 39 (2000) pp. 480-484, Part1 , No. 2A, Feb. 2000, 6 pp.
Amendment after Final Office Action filed Sep. 22, 2017 for U.S. Appl. No. 14/611,162.
Advisory Action dated Oct. 26, 2017 for U.S. Appl. No. 14/611,162.
Response to Non Final Office Action filed Feb. 28, 2017 for U.S. Appl. No. 14/726,429.
Response to Final Office Action filed Nov. 16, 2017 for U.S. Appl. No. 14/726,396.
Amendment and Response accompanying RCE filed Nov. 22, 2017 for U.S. Appl. No. 14/611,162.
Amended Claims filed in EP Application No. 15799569.7 dated Decemer 30, 2016.
Non-Final Office Action filed Dec. 21, 2017 for U.S. Appl. No. 14/726,396.

(56) References Cited

OTHER PUBLICATIONS

Extended European Search Report for EP Appln. No. 15799569.7 dated Jan. 18, 2018.
Amendment after Non-Final Office Action for U.S. Appl. No. 14/726,396 dated Mar. 21, 2018.
Response to Extended EP Search report filed Mar. 29, 2018 for EP application No. 15743704.7.
Office action dated Feb. 2, 2018 for Chinese application No. 201580041059.8, office action is in Chinese language with a translation provided by the foreign associate.
Response to Extended EP Search report filed Apr. 12, 2018 for EP application No. 15743225.3.
Non-Final Office Action for U.S. Appl. No. 15/819,887, dated Apr. 19, 2018.
Office action dated Apr. 3, 2018 for Chinese application No. 201580017627.0, in Chinese language with English translation provided by the foreign associate.
Amendment after Non-Final Office Action for U.S. Appl. No. 15/819,887 dated Jul. 19, 2018.
Notice of Allowance for U.S. Appl. No. 14/726,396 dated Jul. 2, 2018.
Response to Extended Eurpean Search Report filed Jul. 30, 2018 for EP application No. 15799774.3.
Office Action response filed Dec. 3, 2018 for Chinese Appln. No. 201580017626.6, in Chinese language with claims in English.
Response to Office Action filed Jun. 13, 2018 for Chinese application No. 201580041059.8, in Chinese language with claims in English.
Office action dated Oct. 15, 2018 for Chinese application No. 201580041059.8, in Chinese language with a translation provided by the foreign associate.
Response to Office Action filed Nov. 29, 2018 for Japanese Application No. 2016-549347, with claims in English provided by foreign associate.
Response to Office action filed Aug. 13, 2018 for Chinese application No. 201580017627.0, in Chinese language with claims in English.
Non final office action dated Jun. 27, 2018 for U.S. Appl. No. 14/611,162.
Response to Non final office action filed Sep. 26, 2018 for U.S. Appl. No. 14/611,162.
Response to Office action filed Dec. 18, 2018 for Japan application No. 2016-54927, in Japanese language with claims in English.
Response to 2nd Office Action filed Dec. 25, 2018 for Chinese application No. 201580041059.8, in Chinese language.
Notice of Allowance dated Jan. 24, 2019 for U.S. Appl. No. 14/611,162.
Office Action dated Jan. 11, 2019 for Chinese Application No. 201580017627.0, including translation provided by Chinese associate.
Office action dated Jan. 15, 2019 for Israeli application No. 249091, in Israeli language with a translation provided by the foreign associate.
Notice of Allowance dated Mar. 5, 2019 for JP application No. 2016-549347.
Response to Extended European Search Report dated Aug. 14, 2018 for EP application No. 15799569.7, 11 pages.
Office Action dated Jul. 20, 2018 for Chinese Application No. 201580017626.6, including translation provided by Chinese associate.
Notice of Allowance dated Sep. 10, 2018 for U.S. Appl. No. 15/819,887.
Office Action dated Sep. 25, 2018 for Japanese Application No. 2016-549247 with English Translation from foreign associate.
Office Action dated Oct. 6, 2018 for Australian Application No. 2015210704.
Notice of Allowance for U.S. Appl. No. 14/726,396 dated Sep. 28, 2018.
Office Action dated Sep. 21, 2018 for Japanese Application No. 2016-549347, including translation provided by Japanese associate.
Office Action dated Sep. 7, 2018 for Australian Application No. 2015266670.
Office Action dated Oct. 8, 2018 for Chinese Patent Appln. No. 20150041033.3, in Chinese language only.
Notice of Allowance dated May 6, 2019 for Chinese Patent Application No. 201580017626.6; in Chinese language only.
Office action dated Jun. 4, 2019 for Chinese application No. 201580041059.8, in Chinese language with a translation provided by the foreign associate.
Response to 1st Office Action filed Jun. 11, 2019 for Japanese application No. 2016-570027, in Japanese language only.
Response to 1st Office Action filed Jun. 11, 2019 for Japanese application No. 2016-570034, in Japanese language only.
Response to OA filed May 13, 2019 for Israeli application No. 249091, in Israeli language with translation provided by foreign associate.
Notice of Acceptance dated Apr. 26, 2019 for Australian Application No. 2015266670.
Response to Examination Report filed May 2, 2019 for Australian application No. 2015210704.
First Examination Report dated May 3, 2019 for Australian Patent Application No. 2015210708.
Office Action dated Jun. 14, 2019 for Chinese Patent Application No. 201580017627.0, including translation provided by Chinese associate.
Office Action dated May 30, 2019 for U.S. Appl. No. 16/261,455.

* cited by examiner

MULTI-FOCAL DISPLAY SYSTEM AND METHOD

CROSS-REFERENCE TO RELATED APPLICATION(S)

This application claims priority from U.S. Provisional Patent Application Ser. No. 61/934,565 filed on Jan. 31, 2014 entitled "MULTI-FOCAL DISPLAY SYSTEM AND METHOD,". This application is cross-related to U.S. Provisional Patent Application Ser. No. 62/005,834 entitled "METHOD AND SYSTEM FOR CREATING FOCAL PLANES IN VIRTUAL AND AUGMENTED REALITY,", U.S. patent application Ser. No. 14/555,585, entitled "VIRTUAL AND AUGMENTED REALITY SYSTEMS AND METHODS", U.S. Pat. No. 6,046,720, entitled "POINT SOURCE SCANNING APPARATUS AND METHOD," U.S. Pat. No. 7,555,333, entitled "INTEGRATED OPTICAL SCANNING IMAGE ACQUISITION AND DISPLAY," U.S. patent application Ser. No. 11/573,118, entitled "VARIABLE FIXATION VIEWING DISTANCE SCANNED LIGHT DISPLAYS," and U.S. patent application Ser. No. 12/468,832, entitled "SCANNED LASER PROJECTION DISPLAY DEVICES AND METHODS FOR PROJECTING ONE OR MORE IMAGES ONTO A SURFACE WITH A LIGHT-SCANNING OPTICAL FIBER". The content of the aforementioned patent applications is hereby expressly incorporated by reference in its entirety.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

There are numerous challenges when it comes to presenting 3D virtual content to a user of an AR system. A central premise of presenting 3D content to a user involves creating a perception of multiple depths. As in some virtual content appears closer to the user, while other virtual content may appear to be coming from farther away. Thus, to achieve 3D perception, the AR system is configured to deliver virtual content at different focal planes relative to the user.

The U.S. provisional patent applications listed above present systems and techniques to generate various focal planes in the context of AR systems. The design of these virtual reality and/or augmented reality systems presents numerous challenges, including the speed of the system in delivering virtual content, quality of virtual content, eye relief of the user, size and portability of the system, and other system and optical challenges.

The systems and techniques described herein are configured to work with the visual configuration of the typical human to address these challenges.

SUMMARY

Embodiments of the present invention are directed to devices, systems and methods for facilitating virtual reality and/or augmented reality interaction for one or more users. In one aspect, a system for displaying virtual content is disclosed.

In one or more embodiments, an augmented reality system comprises a light projection device operatively coupled to an image source for generating one or more frames of image data, and a composite variable focus element (VFE) system having a first VFE and a second VFE, the first VFE for producing at least two depth planes corresponding to the one or more frames of image data and the second VFE for variably shifting the at least two depth planes at varying distances from the user's eyes.

In one or more embodiments, an augmented reality system comprises an accommodation tracking module to track an accommodation of a user's eyes, a first variable focus element (VFE) to switch between at least two focal planes, and a second VFE to shift the at least two focal planes based at least in part on the tracked accommodation of the user's eyes.

In another aspect, a method of displaying augmented reality comprises providing one or more frames of image data to be presented to a user, transmitting light associated with the one or more frames of image data, focusing a first frame of image data at a first focal plane, focusing a second frame of image data at a second focal plane, and variably shifting the first focal plane and the second focal plane across a range of distances.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to methods, systems, and articles of manufacture for implementing multi-scenario physically-aware design of an electronic circuit design in a single embodiment or in some embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As discussed in U.S. Provisional Application Ser. No. 61/909,774 (now U.S. patent application Ser. No. 14/555, 585); U.S. Pat. Nos. 6,046,720; 7,555,333; 7,784,697; and U.S. patent applications Ser. Nos. 11/573,118 and 12/468, 832, each of which is incorporated by reference herein in its entirety, a variable focus element (hereinafter "VFE") may be used to adjust the wavefront (e.g., focus) of an image in a dynamic fashion, and may be used to generate multi-focal 3D imagery. The VFE may enable analog focus modulation, or may switch between discrete focus states.

The subject of this disclosure is the use of a plurality of VFEs in concert to modulate the focus of images. The use of a plurality of VFEs can enable wavefront modulation characteristics that would be difficult to achieve with a single current state of the art VFE alone. For instance, it can be a challenge to produce a single VFE that simultaneously achieves a large effective aperture, large focus range, low power consumption, and high-speed focus modulation. The use of a plurality of VFEs can enable the advantages of each VFE to be combined, to create a composite VFE system that achieves those criteria.

By placing the VFEs substantially conjugate to an exit pupil in an optical system (such as viewing optics in a near-to-eye display) and/or substantially within a telecentric lens configuration, the VFEs can modulate the focus of an image while maintaining a stable image magnification.

Figure 1:
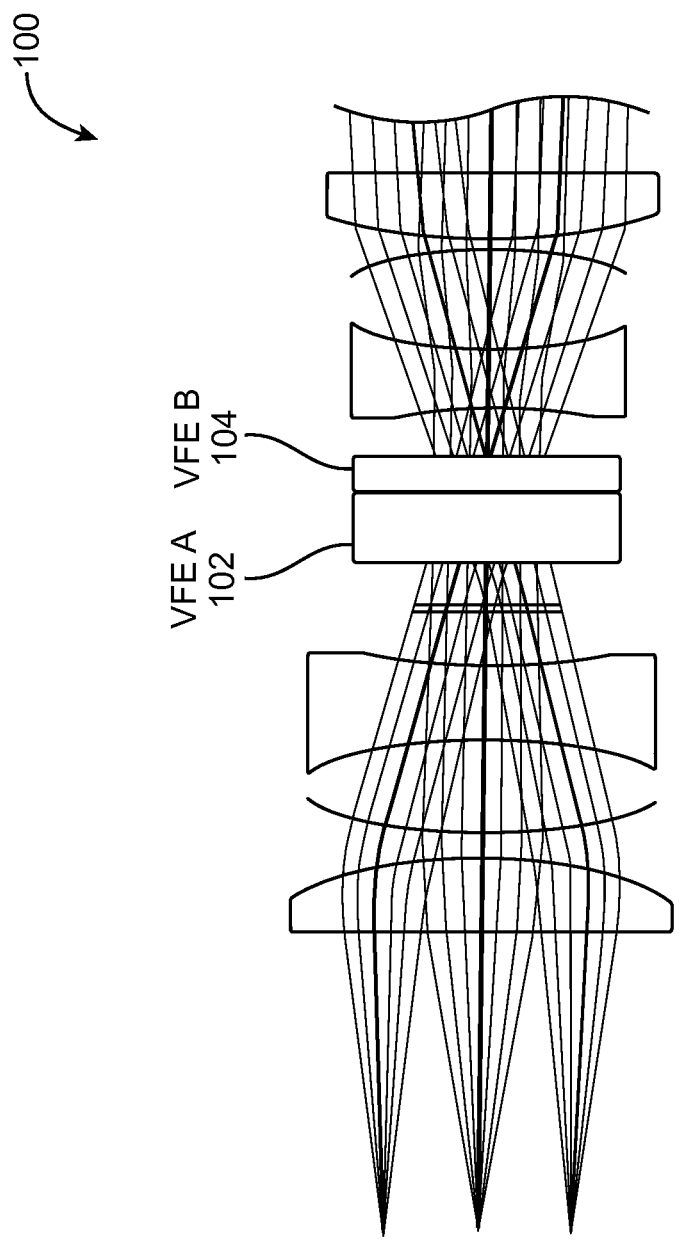
FIG. 1 illustrates a plan view of a long range variable focus element (VFE) and a two state VFE with other optical elements, according to one example embodiment.

FIG. 1 illustrates an example of a portion of one such embodiment, in which the VFEs are placed substantially within a telecentric lens configuration, such that modulation of the VFE generates a change in the focus of incident light, but generates little or no change in image magnification. In this embodiment, two VFEs are shown. The VFE 102 may, for instance, be capable of relative large focus range, such as 0-3 diopters. Such a VFE A 102, may, for the purposes of illustration, be limited in its temporal response time. If used in isolation, such a VFE A 102 may adjust the focus over the course of multiple displayed frames from a operatively coupled image source, but may not be fast enough to modulate between desired focal states on a frame-by-frame basis at the refresh rate of the operatively coupled display; for instance, it may adjust display focus in response to a change in human accommodation or vergence, or in response to the motion of elements within a displayed volumetric scene. The VFE labeled B (104) may comprise a VFE that can switch between focal states more rapidly that VFE A, but may be limited in its total focal range (e.g., 0 to 0.3 diopters) and/or the number of focus states in can produce (e.g., two focus states). By placing VFE A 102 and VFE B 104 in series, their total optical power is combined, such that the focus state of each VFE affects the focus of an operatively coupled display. The relationship may be characterized by an example equation below.

$$\phi = \phi_A + \phi_B - \frac{t}{n}\phi_A\phi_B$$

Figure 2:
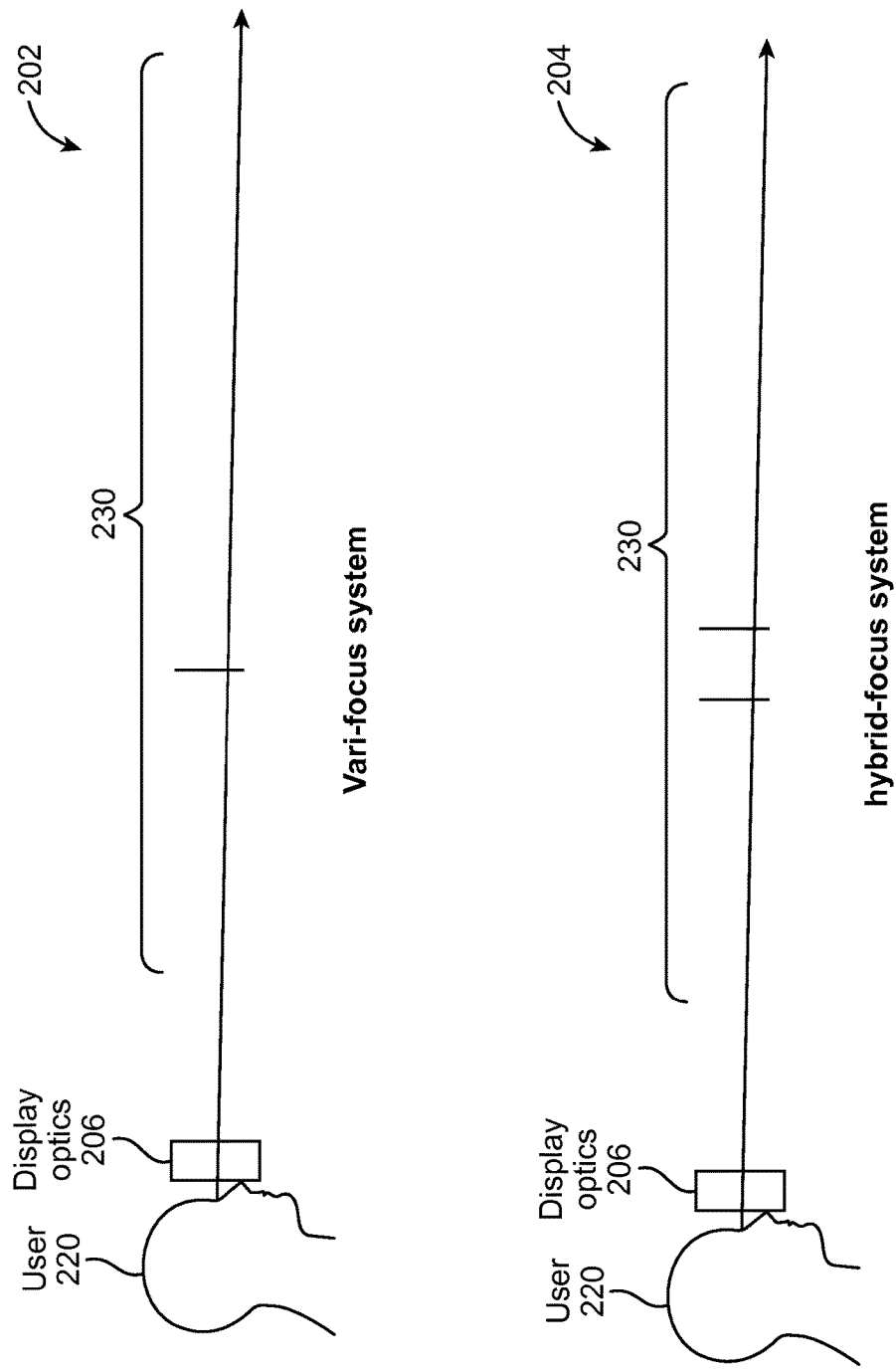
FIG. 2 illustrates a vari-state focus system and a hybrid focus system, according to one example embodiment.

The top portion 202 of FIG. 2, is an example "Vari-focus" system that illustrates a multi-focal display system comprising a single VFE. The optical viewing distance (i.e. the focus distance) or focal plane at which the viewer perceives the virtual image may be varied as shown in FIG. 2. If the single VFE is, for instance, capable of a large focus range but limited in response time, it may be able to modulate the focus of the image in response to a change in a viewer's accommodation or fixation distance within a range 230, but may not be able to switch on a frame-by-frame basis. The bottom portion 204 of FIG. 2 is labeled "hybrid-focus system" and illustrates the viewing condition that can be produced by, for instance, the operation of VFE A and VFE B illustrated in FIG. 1 and described above. By rapidly switching VFE B between two focus states (two focal planes 210), and modulating the focus within the range 230, the persistence of human vision creates the impression in a viewer that he/she is seeing two image planes simultaneously.

By driving an operatively coupled display in synchrony with the VFE B, and displaying one layer of imagery in the even numbered frames and a second layer of imagery in the odd numbered frames, the viewer perceives a multi-focal display, with a relatively small separation between layers. VFE A may be used to shift the closely spaced layers within a larger focus range, over a longer time scale—for instance in response to a change in a viewer's accommodation or fixation distance. By updating the displayed image content in response to a change in a viewer's accommodation or fixation distance, e.g., by re-rendering simulated dioptric blur, the viewer can have the perception that he/she is viewing a multi-focal volumetric image that extends throughout the full focus range supported by the combined optical power of VFEs A and B. The two multiplexed focus states generated by the rapid modulation of VFE B allows the viewer's accommodation to vary within a small range before it is necessary to adjust VFE A, and providing more tolerance to accuracy errors and latency in an operatively coupled accommodation-tracking or eye-tracking system that is used to measure the accommodation or fixation distance of the viewer's eye.

Figure 3:
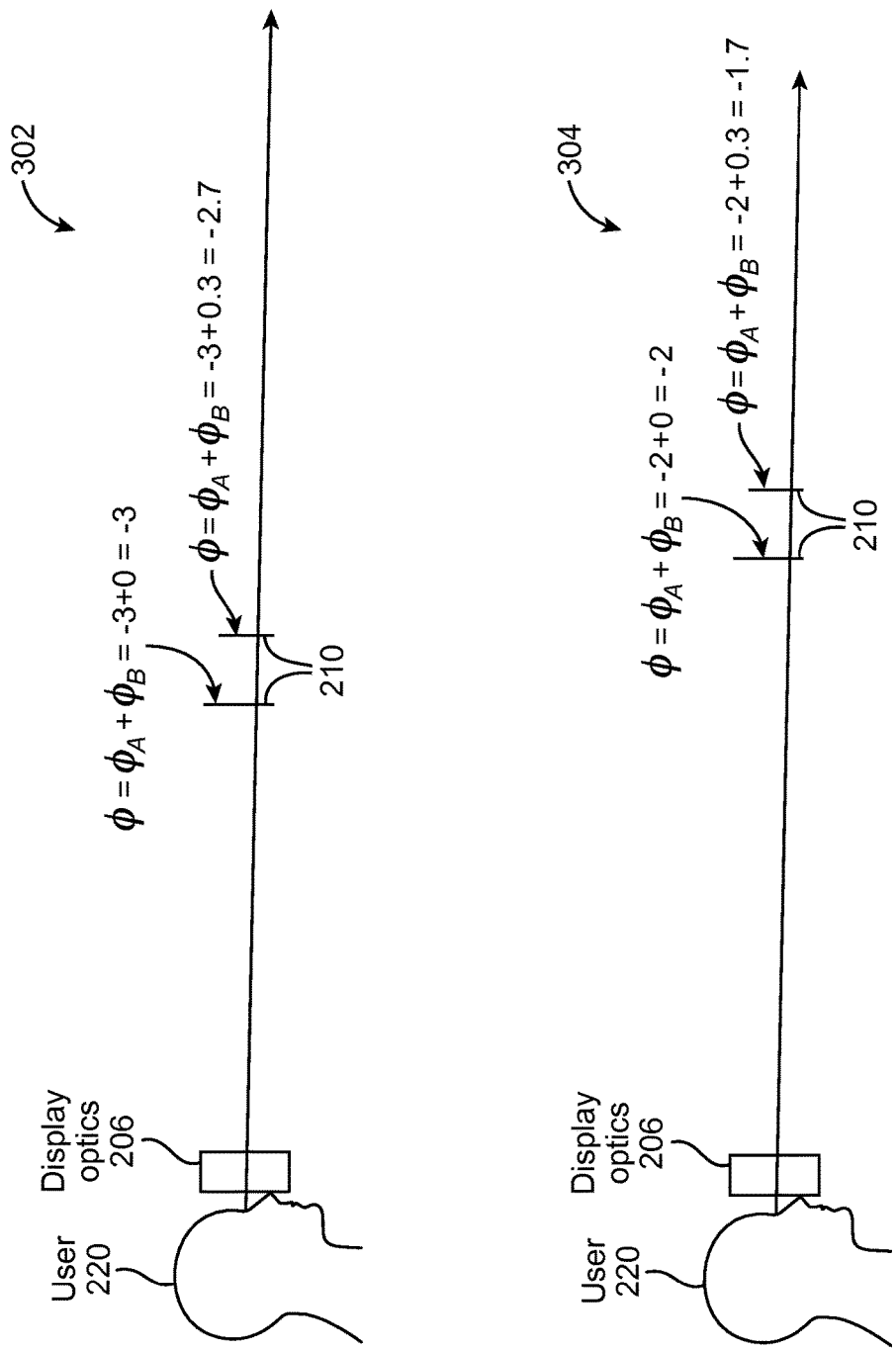
FIG. 3 illustrates an example embodiment of varying focal planes using the hybrid focus system, according to one example embodiment.

FIG. 3 illustrates details of a more specific embodiment, in which VFEs A and B are operatively coupled with a high refresh rate display, such as a Digital Light Projection (DLP) display with a 240 Hz refresh rate. VFE B switches between two focus states (0 and 0.3 diopters) at 240 Hz, and in phase with the DLP refresh, such that all of the even DLP frames are displayed at one optical viewing distance while all of the odd frames are displayed at a different optical viewing distance. By driving the even frames with different image content than the content displayed during the odd frames, one layer of content is positioned at one viewing distance and the other layer of content is positioned at a second viewing distance, and the viewer perceives the two layers to be parts of the same multifocal scene that has an overall effective refresh rate of 120 Hz (240 Hz DLP refresh rate divided by 2 VFE focus states). For instance, the even DLP frames may display an image of a sharply rendered coffee cup, and the odd DLP frames may display an image of a sharply rendered wine glass.

The viewer 220 will perceive a coherent scene containing a coffee cup with a wine glass a small distance behind it. When the viewer looks at the coffee cup, the wine glass will appear slightly blurred, and when he/she shifts eye fixation and accommodation to the wine glass, it will come into sharp focus while the coffee becomes slightly blurred. The top 302 of FIG. 3 shows the two display layers 210 positioned at −3 and −2.7 diopters viewing distance. In our example, the coffee cup would be optically positioned at −3 diopters (i.e., 0.333 meter distance) and the wine glass would be positioned at −2.7 diopters (i.e., 0.370 meter distance). The even and odd DLP frames may each additionally include a somewhat blurred rendering of a flower vase, such that when the viewer gazes at either the coffee cup or the wine glass, he/she will perceive a flower vase in the background of the 3D scene (e.g., at 0.500 meters apparent distance), with the amount of blur that would be expected if it were a real object that were not focused upon at the moment.

If the viewer 220 shifts gaze to the flower vase, an operatively coupled accommodation- and/or eye-tracking system detects the change in focus and triggers a re-rendering of the imagery displayed in the DLP frames, such that the flower vase is rendered in sharp focus, while the coffee cup and wine glass are rendered with some blur. The tracking system also triggers VFE A to shift the two closely spaced focus layers 210 produced by VFE B to the area where the flower vase should reside. The bottom 304 of FIG. 3 illustrates that VFE A has shifted focus state such that the two focus planes produced by VFE B are now at −2 and −1.7 diopters (0.500 meters and 0.588 meters). Now the viewer will have the perception that he/she is looking at the flower vase, it is in sharp focus, and the coffee cup and wine glass are each somewhat blurred.

Though the illustrated examples primarily address a 2 VFE system, any number of VFEs may be used. For instance, a 3 VFE system may be used to achieve a longer total focus range or a larger number of discrete focus states. Also, though the FIG. 1 shows the VFEs in close proximity, they may alternatively be distributed across an optical system. For instance, VFEs may be placed at optically conjugate locations, such that the focus state of each VFE may be modulated without changing the image magnification of an operatively coupled display.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. An augmented reality display system, comprising:
a light projection device operatively coupled to an image source for projecting a pair of consecutive image frames comprising first and second consecutive image frames for viewing by a user's eyes through a display; and a composite variable focus element (VFE) system comprising: a first VFE and a second VFE arranged in series relative to the first VFE, wherein
the composite VFE is structured such that
a total optical power of the composite VFE is a combination of a first optical power of the first VFE and a second optical power of the second VFE
the first VFE is configured to switch between two focus states to focus respective first and second consecutive image frames at respective first and second depth planes, the first VFE being configured to focus respective pairs of consecutive image frames to respective pairs of depth planes,
a first distance between the first depth plane and the second depth plane is based at least in part upon a constant optical power difference comprising a difference between the first optical power of the first VFE and the second optical power of the second VFE, and
the second VFE is configured to further focus the first and second consecutive image frames to third and fourth depth planes, wherein a distance between the third depth plane and the fourth depth plane is based at least in part upon the constant optical power difference.

2. The augmented reality display system of claim 1, further comprising an accommodation tracking module configured to track an accommodation of the user's eyes, wherein the second VFE is configured to focus the first and second consecutive image frames based at least in part on the tracked accommodation of the user's eyes.

3. The augmented reality display system of claim 1, wherein the light projection device is a high refresh rate display, such that the user perceives the first and second consecutive image frames simultaneously.

4. The augmented reality display system of claim 1, wherein the light projection device is a Digital Light Processing (DLP) display.

5. The augmented reality display system of claim 1, wherein the first and second consecutive image frames comprise slices of a three-dimensional scene.

6. An augmented reality display system, comprising:
an accommodation tracking module configured to track an accommodation of a user's eyes through a display;
a first variable focus element (VFE) configured to focus respective pairs of consecutive image frames to respective focal planes and switch between focus states to focus a pair of consecutive image frames comprising first and second consecutive image frames to respective first and second focal planes; and
a second VFE arranged in series relative to the first VFE such that a total optical power of the first FVE and the second VFE is a combination of a first optical power of the first VFE and a second optical power of the second VFE, the second VFE being configured to further focus respective first and second consecutive image frames to respective third and fourth focal planes based at least in part on the tracked accommodation of the user's eyes,
wherein a first distance between the first focal plane and the second focal plane and a second distance between the third focal plane and the fourth focal plane are based at least in part upon a constant optical power difference comprising a difference between a first optical power of the first VFE and a second optical power of the second VFE.

7. The augmented reality display system of claim 6, further comprising an image source configured to provide image data corresponding to the first and second consecutive image frames.

8. The augmented reality display system of claim 7, further comprising a light projection display configured to transmit light associated with the first and second consecutive image frames.

9. The augmented reality display system of claim 7, wherein the first and second consecutive image comprise slices of a three-dimensional scene.

10. A method of displaying augmented reality, comprising:
providing image data corresponding to a pair of image frames comprising first and second consecutive image frames to be presented to a user through a display;
transmitting light associated with the image data to project the first and second consecutive image frames;
focusing the first image frame to a first focal plane using a first variable focus element (VFE);
focusing the second image frame to a second focal plane using the first VFE and arranged in series relative to the first VFE, wherein a total optical power of the first VFE in series with the second VFE comprises a combination of a first optical power of the first VFE and a second optical power of the second VFE, and a first distance between the first focal plane and the second focal plane is based at least in part upon a constant optical power difference comprising a difference between the first optical power of the first VFE and the second optical power of the second VFE;
focusing the first image frame to a third focal plane using the second VFE;
focusing the second image frame to a fourth focal plane using the second VFE,
wherein a distance between the third focal plane and the fourth focal plane is based at least in part upon the constant optical power difference.

11. The method of claim 10, wherein the consecutive first and second image frames comprise slices of a three-dimensional scene.

12. The method of claim 10, further comprising:
tracking an accommodation of the user's eyes; and
the second VFE focusing respective first and second consecutive image frames to respective third and fourth focal planes based at least in part on the tracked accommodation of the user's eyes.

13. The method of claim 10, wherein the first VFE operates at a first speed, and
the second VFE operates at a second speed
greater than the first speed.

14. The method of claim 10, further comprising presenting the consecutive first and second consecutive image frames in rapid succession such that the user perceives the first and second consecutive image frames simultaneously.

15. The augmented reality display system of claim 1, wherein the first VFE is configured to operate in phase with the light projection device such that the first VFE focuses each light frame of generated by the light projection device.

16. The augmented reality display system of claim 15, wherein the first VFE and the light projection device are each configured to operate at 240 Hz.

17. The augmented reality display system of claim 1, wherein the constant optical power difference is 0.3 diopters.

18. The augmented reality display system of claim 1, wherein each of the first and second consecutive image frames includes a blurred virtual object.

19. The augmented reality display system of claim 1, wherein the first VFE is operable at a first speed, and
the second VFE is operable at a second speed greater than the first speed.

20. The method of claim 10, further comprising transmitting the light in phase with focusing the first and second consecutive image frames.

21. The method of claim 20, further comprising transmitting the light at 240 Hz, and focusing the first and second image frames at 240 Hz.

22. The method of claim 10, wherein the constant optical power difference is 0.3 diopters.

23. The method of claim 10, wherein the first and second consecutive image frames each include a blurred virtual object.

\* \* \* \* \*